May 24, 1955 M. G. HANDSCHIN 2,709,202

METHOD FOR THE CODED REMOTE CONTROL OF A TELEPHONOGRAPH
OVER A TELEPHONE SYSTEM AND INSTALLATION
FOR THE PERFORMANCE OF THE METHOD

Filed Oct. 16, 1950 2 Sheets-Sheet 1

Inventor
Max G. Handschin
By Bryant & Lowry
attys.

Fig. 3 Code 201

| Pos. | 204 | 205 | 206 |
| --- | --- | --- | --- |
| 1 | H | — | — |
| 2 | H | H | — |
| 3 | H | H | H |
| 4 | H | T | — |
| 5 | H | H | T |
| 6 | H | T | H |
| 7 | H | T | T |
| 8 | T | — | — |
| 9 | T | T | — |
| 10 | T | T | T |
| 11 | T | H | — |
| 12 | T | T | H |
| 13 | T | H | T |
| 14 | T | H | H |

Fig. 4 Code 202

| Pos. | 207 | 208 | 209 |
| --- | --- | --- | --- |
| 1 | — | — | — |
| 2 | H | — | — |
| 3 | H | H | — |
| 4 | H | H | H |
| 5 | H | T | — |
| 6 | H | H | T |
| 7 | H | T | H |
| 8 | H | T | T |
| 9 | T | — | — |
| 10 | T | T | — |
| 11 | T | T | T |
| 12 | T | H | — |
| 13 | T | T | H |
| 14 | T | H | T |
| 15 | T | H | H |

Fig. 5 Code 203

| Pos. | 210 | 211 | 212 |
| --- | --- | --- | --- |
| 1 | — | — | — |
| 2 | H | — | — |
| 3 | H | H | — |
| 4 | H | H | H |
| 5 | H | T | — |
| 6 | H | H | T |
| 7 | H | T | H |
| 8 | H | T | T |
| 9 | T | — | — |
| 10 | T | T | — |
| 11 | T | T | T |
| 12 | T | H | — |
| 13 | T | T | H |
| 14 | T | H | T |
| 15 | T | H | H |

Inventor
Max G. Handschin
By Bryant & Lowry
attys.

2,709,202

METHOD FOR THE CODED REMOTE CONTROL OF A TELEPHONOGRAPH OVER A TELEPHONE SYSTEM AND INSTALLATION FOR THE PERFORMANCE OF THE METHOD

Max G. Handschin, Zurich, Switzerland, assignor to Promundo, Schaan, Liechtenstein, a firm Application October 16, 1950, Serial No. 190,356

5 Claims. (Cl. 179—6)

It is known that telephonographs can be operated over telephone systems with vowels for reproduction purposes. It is further known that the individual vowels A, E, I, O and U must be sent in the sequence of the code for which the installation is adjusted if the telephonograph is to perform the reproduction.

However, in the case of such installations it must be ensured that no unauthorised person should be able to release the reproduction system. This makes the installation more complicated and increases its cost by the price of filters and automatic control members. Moreover, certain vowels are altogether unsuitable for transmission over the telephone system, because the telephone net allows only frequencies of abt. 300 to 2500 Hertz to pass.

However, in order to make it possible to differentiate between the individual vowels or characteristic frequencies it is necessary to add, for example, for the vowels E, I and O at least two filters each to the coding device.

Furthermore, the known installations have certain shortcomings: amongst others it is necessary for the caller to enounce the vowels very distinctly and accurately which is a very difficult thing in some languages and expressions, and it is equally essential for the rhythm of the sending of the vowels to be exactly adhered to. Furthermore, it is important for the telecontrol of a telephonograph provided with a coding device to function in such a manner that the caller does not become aware of having pronounced a wrong code, or one vowel too many or too few.

The present invention obviates all these shortcomings by an especially simple and foolproof means, mainly characterised by the fact that in calling up the installation only words, numbers or other sounds of a high and a low frequency are used and transmitted according to the code for which the telephonograph has been adjusted.

The installation for the coded telecontrol of a telephonograph, connected to a telephone system, having a coding device automatically actuated by the incoming call and operated over a telephone circuit is characterised by the provision of two filters of which one responds only to incoming signals of a high frequency and the other to those of a low frequency.

The attached drawing shows one example of the installation according to the present invention, and this example may at the same time serve to explain one way of performing the method according to the present invention.

In this drawing:

Figs. 3–5 represent various switch positions of code switches.

Figure 1:
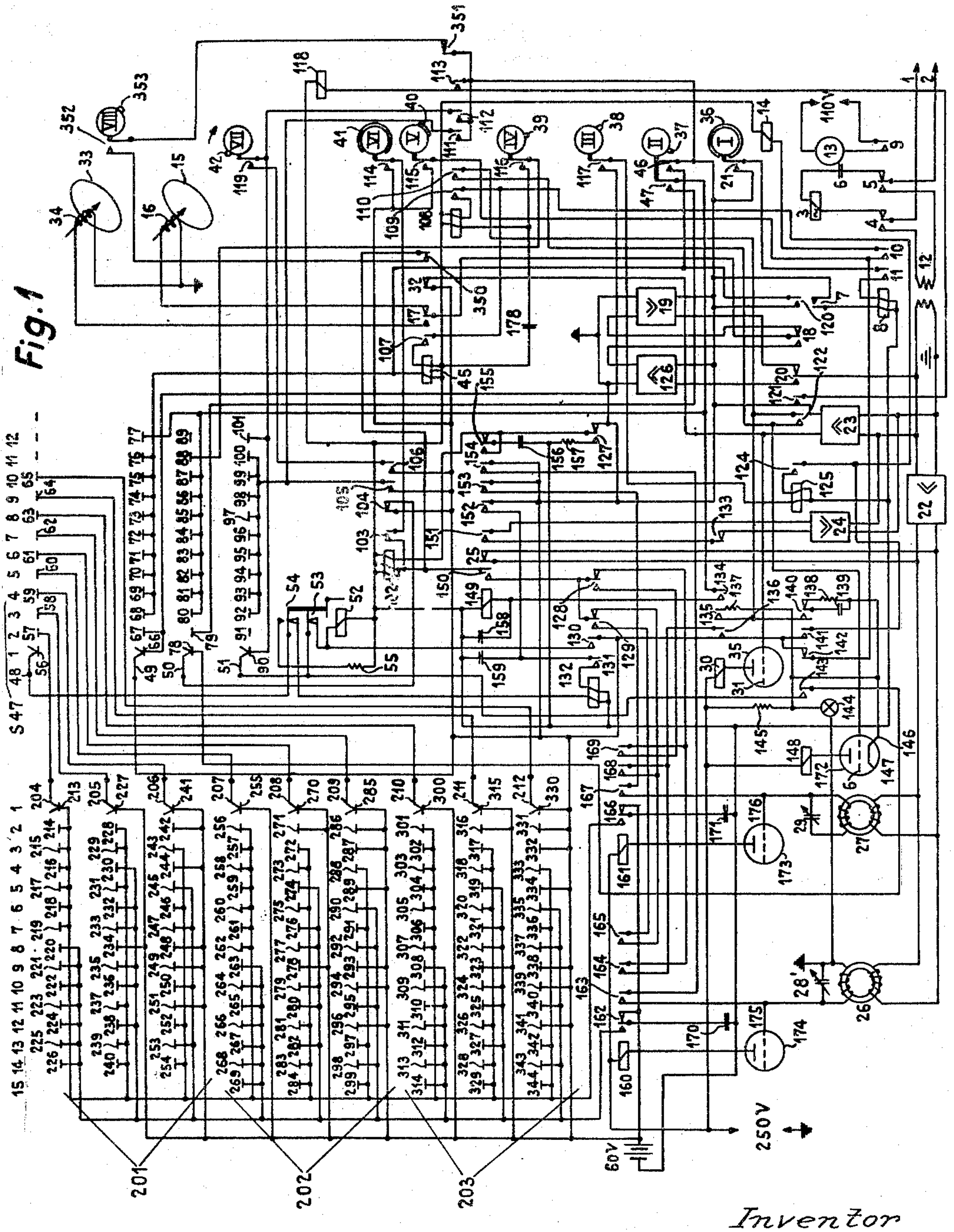
Fig. 1 is a wiring diagram

Fig. 1 in the attached drawing may be used to explain a wiring diagram for one example of the performance of the present invention.

If any one subscriber makes a call, then a connection between the subscriber and the telephonograph is made over the lines 1 and 2 and the telephone exchange (by means as such known and not shown in the drawing). The ringing current emitted by the exchange energises a relay 3 over contacts 4, 5 as well as over a condenser 6. Relay 3 then closes a contact 7 and energises a relay 8 over the circuit: earth, contact 7, solenoid (attracting coil) of relay 8, battery. Relay 8 reverses, i. e. closes, its contacts 4, 5, 9, 10 and 11. Over contact 9 the circuit of a motor 13 is closed. Moreover, the lines 1 and 2 are connected by the reversal of contacts 4, 5 to a repeater 12. In this manner the connection between the telephonograph and the telephone exchange is held.

Then, an electromagnetic coupling 14 of an answering apparatus is excited over the circuit: earth, contact 142, contact 10, coupling 14, battery. The motor 13 drives seven cam discs I–VII of a considerable reduction ratio which now begin to rotate in the direction indicated by the arrow. Simultaneously, motor 13 sets a sound carrier 15 in motion, and the caller hears the answering apparatus over a speaker head 16 via the circuit: earth, speaker head 16, contact 17, contact 18, reproduction amplifier 19, contact 20, repeater 12, earth.

Relay 8 remains in the attracted position through excitation over the circuit: earth, contact 21 of cam disc 1, contact 11, holding-on coil of relay 8, battery.

A filter amplifier 22, an impulse amplifier 23 and a buzzer 24, which may be any suitable device for impressing audio-frequency impulses on the line, are now likewise connected to the repeater 12 and thus to the telephone exchange.

The output end of filter amplifier 22 is still shortcircuited by means of a contact 25 which ensures that the output end of the filter amplifier, and consequently two filters 26 and 27, is not released until the caller has pronounced the first consonant of a word, a number etc. An impulse relay 30 receives all impulses sent by either the caller or the telephonograph, i. e. including those originating from a sound carrier 33 or a speaker head 34 during reproduction. However, in order to block the impulses while the sound carrier 15 (answering apparatus) reproduces, the grid 31 of a valve vacuum tube 35 is connected to earth over the circuit: earth, contact 32, grid 31 of valve 35.

In this manner it is provided that the relay 30 is not energized while the caller hears the answering apparatus over the telephone system. This period corresponds to the distance 43 in Fig. 2. After reproduction has ceased a relay 45 is energised by cam 37 of cam disc II over the circuit: earth, contact 46 (cam disc II), solenoid of relay 45, battery.

Figure 2:
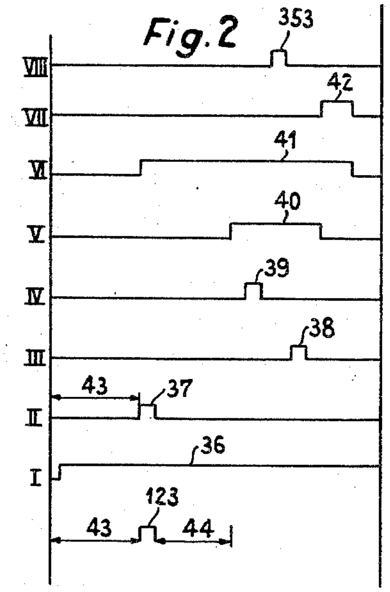
Fig. 2 is a wiring arrangement.

However, relay 45 will remain excited for a short time (not exceeding one second) only, see distance 123 in Fig. 2. That is the time at the disposal of the caller for the sending of the first high or low frequency impulse according to the code for which adjustment has been made. Since the wiring diagram in Fig. 1 is drawn in the rest position—i. e. it was assumed for this purpose that no imprints have yet been recorded on sound carrier 33, and that in addition the caller has sent no impulses during the time represented by time line 46 (Fig. 2)—the caller will then receive from the answering apparatus, i. e. from sound carrier 15, the signal "to come in."

By means of its cam 38 the cam disc III has closed a contact 117 whereby a recording relay 125 is excited over the circuit: earth, selector S47, contact arm 49, segment 66, contact 117, cam disc III, solenoid of relay 125, battery.

Relay 125 now disconnects reproduction amplifier 19 and connects recording amplifier 126, i. e. it connects the latter to the repeater 12, over the circuit: earth, repeater 12, contact 20, recording amplifier 126, contact 18, contact 17, speaker head 34, sound carrier 33.

Relay 45, too, was excited when relay 125 was attracted, which took place over the following circuit: earth, contact 120, solenoid of relay 45, battery.

Relay 45 has thus closed, i. e. reversed, its contacts 17, 32 and 107.

The blocking of relay 30, or of the grid 31 of valve 35 respectively, is released through opening contact 32. If the caller now makes a call, relay 30 is excited over impulse amplifier 23 and tube 35, i. e. relay 30 responds to the impulses sent by the caller, and in so doing it opens contacts 136, 135, 134 and 133. Relay 149 cannot be excited in spite of the closing of contact 134, because by now cam disc II has again separated the two contact pieces 46 and 47 by means of its cam 37. The closing of contact 135 of relay 30 now excites an impulse-holding relay 148 whose release is materially delayed by a condenser 139, i. e. it will now bridge over the gaps between sound impulses produced by the caller. This device initiates the disconnection of the telephonograph. Relay 148 is excited over the circuit: potential divider 145—144, cathode 146 of valve 172, resistance 137, contact 135, contact 122, grid 147 of valve 172, anode of the same valve, relay 148, terminal +250 v.

The potential divider consists of a resistance 145 and a lamp 144; it ensures that the delay or the duration of the release of relay 148 is kept constant.

The holding action of relay 148 is maintained, while the caller does not speak, over the circuit: potential divider 145—144, cathode 146, condenser 139, contact 140, contact 122, grid 147, anode, relay 148, terminal +250 v.

In the rest position of contact 140 the condenser 139 is short-circuited over a resistance 138.

The holding or relay 125 and relay 45 is now taken over by relay 148, i. e. by its contact 141, over the circuit: earth, contact 141, contact 124, holding-on coil of relay 125, battery and, in parallel, relay 45, contact 107, holding-on coil of relay 45, battery.

A circuit containing the electromagnetic coupling 14 is interrupted by relay 148 by the opening of contact 142, i. e. the holding or advance of cam discs I–VII and the sound carrier 15 is taken over by cam disc V, i. e. by its contact, over the circuit: earth, contact 115, contact 10, an electromagnetic coupling KA14, battery.

As soon as contact 115 is broken once more, the answering apparatus will stop, i. e. coupling 14 will again be currentless. After relay 148 has been excited, a selector magnet 52 is excited and the segment arms 48–51 move one step forward, i. e. to position 2. This position 2 warns the telephonograph that a message has come in on the sound carrier 33. The selector magnet 52 is excited over the circuit: earth, contact 104, segment arm 50, segment 78, contact 143, contact 53, selector magnet 52, battery.

But the selector magnet 52 is again immediately de-energized.

The messages now spoken by the caller are magnetically recorded in known manner on sound carrier 33 via the speaker head 34.

Now, an electromagnetic coupling 118 sets the sound carrier 15 in motion, i. e. couples it to the motor 13 in known manner (no details are shown in the diagram). The coupling 118 is excited over the circuit: earth, contact 121 of relay 125, electromagnetic coupling 118, battery.

When the caller has finished his message, impulse relay 30 is no longer energised while relay 148 remains excited (for abt. 7 seconds) until the condenser 139 is charged. Then, relay 148, too, becomes currentless. Opening the contact 141 disconnects relay 125 and relay 45. After that time (abt. 7 seconds) relay 30 can no longer be energized, because the grid 31 of valve 35 has again been connected to earth over contact 32.

The answering apparatus, i. e. its coupling 14, will remain excited by the closing of contact 142 until the answering apparatus, i. e. its cam disc I, breaks contact 21. The answering apparatus, i. e. its cam discs I to VII and with them sound carrier 15, are back in the zero position. Thus, relay 8, too, is de-energized and the lines 1 and 2 are again connected to the A. C. relay 3.

The adjustment for a certain code is performed by means of the code switches 201, 202 and 203. These are three orthodox switches of commercial type, of which the first has 14 positions and the two others 15 positions each.

In Figs. 3 to 5 the switch positions obtainable with these switches are shown. In these, T signifies that a low frequency (for example 200 to 400 Hertz) has been adjusted and H that a high frequency (for example 1600 to 2200 Hertz) has been adjusted. If switch 201 is set, for example, for position 7, switch 202 for position 2 and switch 203 for position 1, then the following codes are obtained: H, T, T; H, O, O; O, O, O. Before setting out on an intended journey the owner of the installation adjusts it for any code he chooses. He can now call up his set from any place, if this is done in exact conformity with the code for which the set has been adjusted, i. e. in the above example by sending signals of high-low-low-high frequencies, then the set is correctly controlled and will begin reproducing the messages its receiving part has recorded in the meantime. What takes place inside the set when this happens is explained in detail in the following examples.

*Example 1.—Correct call-up with codes of H–T–T–H frequencies*

The call is made as described. Relay 3 is excited by the ringing current whereupon the relay is energized over contact 7 and is held over contacts 21 and 10. The electromagnetic coupling 14 is likewise excited and the caller hears the answering apparatus, i. e. the message of the sound carrier 15. After cam 37 of cam disc II has closed its contacts 46 and 47, the caller may send his first code call (high frequency). Thereby the relay 30 is excited over the circuit: earth, repeater 12, impulse amplifier 23, grid 31 of tube 35, anode, relay 30, terminal +250 v.

The selector S47 is at position 2 so that it is now possible to excite the impulse filter relay 149 which, with its contact 25, releases the filter exit, so that the two filters 26 and 27 are connected with the caller. Relay 149 is energised over the circuit: earth, contact 104, selector arm 50 (pos. 2), segment 79, contact 47 of cam disc II, contact 134 of relay 30, relay 149, battery.

Condenser 158 is charged, too, and as a consequence relay 149 will release with a time-lag. During that time a short buzzing sound is transmitted to the caller.

Since the caller speaks a high frequency sound, relay 161 is excited over filter 27, capacity regulator 29, grid 176 of tube 173, relay 161, terminal +250 v. Relay 160, on the other hand, is not energised. Since peak voltages occur for a very short time only, relay 161 is held over grid 176 over the circuit: earth, contact 153 of relay 149, contact 157 of relay 161, grid 176 of tube 173.

The condenser 171 charged in the rest position of relay 161 is now discharged over the code switch 201, the selector S47, and the relay 132 over the circuit: condenser discharge 171, contact 166 of relay 161, segment 213 (pos. 7), code switch 201, segment arm 204, selector S47 (pos. 2), segment 57, selector arm 48, contact 54 of selector magnet 52, solenoid of relay 132, battery.

Relay 132, which also releases with a time-lag, is held by condenser 159 over the circuit: earth, contact 152, contact 131, holding-on coil of relay 132, battery.

It needs to be added in this connection that grid 31 was freed through the excitation of relay 45 over contact 32. After the test relay 132 has been energised, the selector magnet 52 is excited over the circuit: earth, contact 130, selector magnet 52, battery.

The solenoid of relay 132 is de-energised, as the selector magnet 52 separates or reverses its contacts 53 and 54. The residual current of condenser 171 is destroyed over the resistance 55 and contact 54.

When the caller has pronounced his code, the relay 30 becomes currentless. The caller hears a short buzzing sound (delayed release of relay 149) over the circuit: earth, contact 151, contact 133 of released relay 30, buzzer 24, repeater 12, telephone exchange (or caller respectively).

Now, relays 149, 161 and 132 become currentless, too, which in turn also de-energises the selector magnet 52, whereby contact arms 48 to 51 were advanced from pos. 2 to pos. 3.

Relay 45 is no longer energised by contact 46 of cam disc II, because by then the cam 37 of cam disc II has once more separated the two contacts 46 and 47, but relay 45 is held over the circuit: earth, selector arm 49, segment 68, solenoid of relay 45, battery.

Relay 45 is now held during the whole calling period over selector S47, i. e. its arm 49 and the segments 69 to 76.

After the caller has heard the short buzzing sound he may call the second code. In our example this is a low frequency. Thus, relay 30 is again excited, as is relay 149, which frees the short-circuited exit of filter amplifier 22 and connects the line to the two filters 26 and 27 respectively. Relay 149 is now no longer excited over contact 47 of cam disc II but over the circuit: earth, contact 104 of relay 102, selector arm 50, segment 80, contact 134 of relay 30, relay 149, battery.

In our example we assume that the caller pronounces the code correctly, i. e. he sends a low frequency, whereby relay 160 is energised over the circuit: exit of filter amplifier 22, filter 26, capacity regulator 28, grid 175 of tube 174, anode, relay 160, terminal +250 v.

The condenser 170 which is in the rest position will now excite test relay 132 over the circuit: condenser discharge 170, contact 162 of relay 160, code switch 201, segment 233 (pos. 7), segment arm 205, selector S47 (pos. 3), segment 58, selector arm 48, contact 54, solenoid of relay 132, battery.

Relay 132 is again held over contact 152. Relay 160 is held over the circuit: earth, contact 154 of relay 149, contact 153 of the same relay, grid 175, anode, relay 160, terminal +250 v.

It needs yet to be mentioned that the electromagnetic coupling 14 of the answering apparatus remains in operation, even when relay 30 breaks its contact 142, which takes place over the circuit: earth, contact 115 of cam disc V, contact 10, coupling 14, battery.

The answering apparatus, i. e. its cam discs I to VII and the sound carrier 15, continues to advance until contact 115 of cam disc V is broken. Owing to the excitation of relay 45, i. e. through the disconnection of speaker head 16 due to the reversal of contact 17, the caller does not hear now the invitation "to come in" mentioned in the preceding example.

As soon as the caller has pronounced the second code he will again hear a short buzzing sound over the released relay 30 and the released time-lag relay 149.

The selector S47 and its arms 48 to 51 are advanced to pos. 4. The residual voltage of condenser 170 is destroyed, as in the case of condenser 171, over the discharge resistance 55 whereby it is made impossible for the selector arms 48 to 51 to energise once more the residual voltage of relay 132 when they are advanced.

The caller will now pronounce the third code, in our example a low frequency. Relays 30, 139 and 160 are again energised. Relay 132 is excited over the circuit: condenser discharge 170, contact 162 of relay 160, code switch 201, segment 247, segment arm 206, selector S47 (pos. 4), segment 59, selector arm 48, contact 54, solenoid of relay 132, battery.

Now, after having heard the buzzing sound the caller pronounces the fourth and last code (high frequency). All circuits are again excited, as mentioned before. Since a high frequency comes in over the line, relay 161 is again excited as in the case of the first code. Relay 132 is excited by condenser 171 over the circuit: condenser discharge 171, contact 166 of relay 161, code switch 202 (pos. 2), segment 256, segment arm 207, selector S47 (pos. 5), segment 60, selector arm 48, contact 54, solenoid of relay 132, battery.

The individual circuits of relays 30, 149 (delayed), 132 (delayed) and 161 become currentless.

Selector S47 must now be advanced to pos. 11 over the following circuit: earth, code switch 202 (pos. 2), segment 271, segment arm 208, selector S47 (pos. 6), segment 61, selector arm 48, contact 54, solenoid of relay 132, battery.

The selector magnet 52 is energised over the circuit: earth, contact 130, selector magnet 52, battery.

Relay 132 is again de-energised through the opening of contact 54 and simultaneously the same happens to selector magnet 52. Since segment arm 209 of code switch 202 is at pos. 2 and the segment arms 210, 211 and 212 of code switch 203 at pos. 1, the segments 286, 300, 315 and 330 will continue alternately to energise and de-energise relay 132. In addition, relay 132 will attract and release with its contact 130 the selector magnet 52.

Thus, selector S47 will be at pos. 11 at the end of the impulse series.

Cam discs I to VII, and with them sound carrier 15, still continue their advance. It was impossible for relay 125 to be excited although cam 38 of cam disc III had closed contact 117, because selector S47 is no longer at pos. 1 or 2 respectively.

The recording constellation is thus prevented and, once the caller has sent the correct code, reproduction can be initiated.

Cam disc IV will close its contact 116 with its cam 39 and relay 108 can be energised over the circuit: earth, contact 104 of relay 102, selector arm 50, segment 88 (pos. 11), contact 116 of disc IV, solenoid of relay 108, battery.

The electromagnetic coupling 118 is excited over the circuit: earth, contact 113 of relay 108, coupling 118, battery.

In the diagram in Fig. 1 the re-winding of sound carrier 33 is not shown in detail, because it is assumed as known. It is assumed that sound carrier 33 with its speaker head 34 is back again in the starting position and that its reproduction can now be heard already by engaging the electromagnet 118. The answering apparatus, i. e. its cam discs I to VII and with them the sound carrier 15, continues to advance over the circuit: earth, contact 115 of cam disc V, contact 10, coupling 14, battery.

As soon as cam 40 has again broken contact 115, the answering apparatus will come to rest. Thus the caller now hears the message from sound carrier 33 over the circuit: earth, speaker head 34, contact 17 of relay 45, contact 18, reproduction amplifier 19, contact 20, repeater 12, earth.

Relay 45 is still energised over the circuit: earth, selector arm 49, segment 76, solenoid of relay 45, battery.

It is now possible for impulse relay 30 to be energised, i. e. it will follow the impulses parallel to repeater 12 over the impulse amplifier 23, over the circuit: earth, repeater 12, impulse amplifier 23, grid 31, anode, relay 30, terminal +250 v.

Since relay 108 is energised, the impulse holding relay 148 is again excited as during recording, over the circuit: potential divider 144 and 145, cathode 146, resistance 137, contact 135 of relay 30, contact 160, grid 147 of valve 172, anode, relay 148, terminal +250 v.

The holding of relay 148 during the impulse of relay 30 will now be taken over by condenser 139. The holding of relay 108 and relay 45 is now ensured over the circuit : earth, contact 141 of relay 148, contact 109 of relay 108, battery and in parallel over contact 107, relay 45, battery.

Selector S47 can now return to its original position by being excited over the circuit: earth, contacts 111 and 112 of relay 108, segments 92 to 100 on the one hand, and segments 101 and 90 (selector S47), selector arm 51, contact 53 (automatic interruptor), selector magnet 52, battery, on the other hand.

The selector will thus return to pos. 2 which corresponds to a new recording or a reproduction control impulse. When reproduction ceases, i. e. when impulse relay 30 receives no more impulses, impulse holding relay 148 becomes currentless, too (for example after 7 seconds). This de-energises relays 108 and 45 and the electromagnetic coupling 118, whereby the sound carrier 33 is brought to a standstill.

The releasing of relay 148 (contact 142) returns the answering apparatus, i. e. cam discs I to VII and with them sound carrier 15, to the starting position.

On breaking contact 21 of cam disc I, the relay 8 is released and the telephone line is once more connected to A. C. relay 3.

*Example 2*

For the second example it is assumed that the caller has sent the first code (high frequency) correctly but the second code wrongly, using neither a low nor a high frequency but a medium one. The call, the connection of lines 1 and 2, as well as the individual circuits are energised in the same manner as in Example 1. Thus selector S47 is at position 3. If the caller now sends a frequency to which the filters 26 and 27 are insensitive, i. e. for which the relays 161 and 160 cannot be excited, then the telephonograph will refuse reproduction, i. e. block it. Let it be assumed that the caller sends a frequency other than those of the two filters 26 and 27: this will leave relays 161 and 160 currentless and test relay 132 cannot now be excited. Relay 149, on the other hand, will always respond to excitation and will free the short-circuit of the filter exit through its contact 25. Since the caller does not send a low or a high frequency but an intermediate one, relay 30 and with it relay 149 will be energised, as already described. A wrong call is detected, i. e. reproduction to unauthorised callers prevented, by means of relay 102. This is a special type of relay whose one winding is excited by condenser 156, and which introduces a time-lag of about 100 milliseconds; the winding may consist of two parts, viz. of a secondary winding of many turns and of a primary winding of only few turns. As soon as the current is switched on it will rise faster in the primary winding which has a small self-induction compared with that of the current in the secondary winding, whereby a field opposed to the secondary winding is formed. The secondary winding will not form the secondary field until some time (abt. 100 milliseconds) later. The excitation of relay 149 charges condenser 156 over the circuit: earth, contact 127 of relay 132, contact 155, condenser 156, battery.

When the caller has finished speaking, relay 30 becomes currentless and relay 149 is released after a time-lag. The caller will hear the buzzing sound, irrespective of whether he has pronounced the codes correctly or wrongly. In this way the secrecy of the code is maintained. Relay 149 having been de-energised, the charged condenser 156 is able to energise relay 112 over the circuit: condenser discharge 156, contact 155 of relay 141, solenoid of relay 112, battery.

It should also be mentioned that, when the correct code signals come in, relay 102 cannot be energised over the last-mentioned circuit, because correct codes excite relay 132 so that whenever that happens condenser 156 is discharged via the discharge resistance 157, over the circuit: battery, discharge resistance 157, contact 127 of the attracted relay 132, contact 155 of the attracted relay 149, condenser 156, battery.

Thus, relay 102 was excited and is held over the circuit: earth, contact 114 of cam disc VI, contact 103, second winding of relay 102, battery.

Relay 102 now advances the selector S 47 from pos. 3 to pos. 12. The two contacts 105 and 106 of relay 102 are closed and the following circuit is formed for the selector magnet 52: earth, contact 105 of relay 102, segments 92 to 100, selector arm 51, contact 53 (automatic interruptor contact), selector magnet 52, battery.

Thus selector S 47 advances as far as position 12. To prevent the excitation of relay 108 (reproduction system pos. 11, selector S 47) the earth is disconnected from selector arm 50 by the reversal of contact 104 of relay 102. Relay 45 is held over the circuit: earth, selector arm 49, segment 77 (pos. 12) solenoid of relay 45, battery.

Relay 45 must remain energised to make it possible for the caller to send the rest of his frequencies. Relay 30 and relay 149 remain excited, and the caller thus continues to hear the buzzing sound. The answering apparatus, i. e. the electromagnetic coupling 14, has continued its rotation in the direction of the arrow during this process and, as a matter of course, so has the sound carrier 15 coupled with it.

It is necessary to return selector S47 to its original starting position 2 to make the installation ready for the next recording or reproduction impulse. This is done over the following circuit: earth, contact 106 of relay 102, contact 119 of cam disc VII, segments 101 and 90, selector arm 51, contact 53, selector magnet 52, battery.

As soon as relay 102 ceases to be held (breaking of contact 114 of cam disc VI) any further impulse sent by the caller remains ineffective, because relay 45 is de-energised (return of selector S47 from pos. 12 to pos. 2) and the grid 31 is connected to earth (contact 32 of relay 45).

The disconnection is carried out, as previously described, by breaking the contact 21 of cam disc I, or by the relay 8 becoming de-energised. In this way the telephonograph is again connected with the telephone system over relay 3.

*Example 3.—Wrong call-up*

Let it be assumed that the caller is trying to get the installation to reproduce and that he has pronounced, for example, the first code (high frequency) correctly.

According to our example it is still assumed that code switch 201 is at pos. 7, 202 at pos. 2 and 203 at pos. 1, according to the code: high-low-low-high frequencies.

All circuits have been energised in the same sequence as in Example 1. According to our example the caller should now send a low frequency. If he were to send a high frequency, relay 102 (wrong control impulse) would be energised.

Relays 30 and 149 were again energised in known manner. It was not possible to excite relay 132, so that relay 102 was excited by means of condenser discharge 156 and held as in Example 2.

However, if the caller were to send a high-frequency and immediately after it, without intermission, a low one, then relay 30 and with it relay 149 would remain excited during the whole time (high and low frequencies). Consequently a frequency, the low one in our example, will energise relay 132 (correct control impulse). Since, however the caller follows up without a break with a high frequency he will fail to get any reproduction, although the low frequency is correct. This arrangement (blocking) thus makes it impossible for a caller who does not know the code to obtain reproduction.

When the low frequency is sent (control impulse correct according to code) relay 160 is energised. Condenser discharge 170 will, as already described, excite relay 132.

Relay 102 is not yet energised. If, however, the caller sends the high frequency without any break, then relay 102 is immediately excited, and reproduction prevented, over the circuit: earth, contact 136 of relay 30, contact 168 of relay 161 (which has now also been energised by the incoming high frequency impulse), contact 165 of relay 160 (which remains excited by the grid-holding, relay 149), contact 154, contact 129 (relay 132 which is excited and held by contact 152 or relay 149), contact 150 (relay 149, which is likewise still excited), release-delaying winding of relay 102, battery.

For the other circuits and the disconnection see above. It goes without saying that reproduction is prevented also if the caller first sends the high (wrong) frequency and then the low (correct) frequency without intermission. When the caller sends the high frequency, relays 30, 149 and 161 are excited in known manner. Relay 132 is thus not yet excited, so that the following circuit arises for relay 102: earth, contact 136 of relay 30, contact 168 of relay 161, contact 129 of the de-energized relay 132, contact 150 of relay 149, release-delaying winding of relay 102, battery.

Thus relay 102 is energised and takes care of the prevention of the reproduction, i. e., of the requisite disconnection.

The two contacts 129 and 128 of relay 132 and the contacts 168, 169, 164 and 165 of relays 160 and 161 ensure, on one hand, the necessary blocking if both frequencies come in at the same time and, on the other hand, that reproduction is prevented, i. e. relay 102 energised, if the two frequencies come in without intermission, immediately following upon each other.

The buzzing sound is heard on the telephonograph in any case, irrespective of whether the caller pronounces the word or number (i. e. sends high or low frequencies) correctly or not. This arrangement is important and its purpose is to defeat an unauthorised caller's object who sends high and low frequencies simultaneously, what he must do is speak intermittently, i. e. he must stop speaking, and when he does he will hear the buzzing sound.

This blocking method is likewise of great importance. Relay 102 is released with a time-lag. Furthermore, it is energised by means of condenser 156. This relay is always excited if, during the period when the control impulses are received, the filters 26, 27 block the passage. Furthermore, relay 102 is excited also if the high and the low frequencies are pronounced in one breath—i. e. without intermission—when reproduction is prevented. Only in this manner is it possible to provide a choice of 2000 blocking combinations. Moreover, if the frequencies are sent correctly, condenser 156 is discharged every time over contact 127 whereby it prevents the excitation of relay 102. In other words, it cannot happen that the caller is allowed to send another frequency than the adjusted one and still obtain reproduction. Furthermore, he can send only one frequency between two buzzing sounds, because otherwise relay 102 would be excited.

The condensers 170, 171 are discharged every time after relay 132 is tested, over contact 154 and resistance 55 respectively. In this manner it is prevented that relay 132 is energised once more, i. e. if there were any residual current in the condensers 170, 171, then relay 132 and, after its release, selector magnet 52, would be excited once more, since relays 160, 161 are released with a time-lag.

The selector S47 indicates whether an incoming message has been recorded on sound carrier 33 or not.

Every time relay 149 is excited, relays 160, 161 are held by the closing of the contacts 154 or 153 via the grid, i. e. grids 155, 176 are connected to earth. By this arrangement it is ensured that the frequencies concerned are only of short duration and at the same it is positively guaranteed that the whole installation (i. e. condensers 170, 171) have adequate voltage. For the excitation of relay 132 these relays 160, 161 are held via the grids until relay 149 is again de-energised.

*Example 4.—Wrong control impulses*

It goes without saying that the reproduction must be blocked also when the caller sends fewer low or high frequencies than the number of low or high frequencies for which code switches 201, 202 and 203 are adjusted. In our example the caller would have to pronounce high-low-low-high frequencies. Let us assume that the caller pronounces only three codes, for example high low, low, high, low. For this purpose it is necessary for relay 102 to be energised. The functions have already been described above. Let it be assumed that the caller has pronounced only three codes, then selector S47 will remain stationary at position 4.

Since, however, the caller does not pronounce any more words, numbers, etc., relay 102 is now being energised by the circuit: earth, contact 151, contact 152, contact 150, relay 102, battery. The relay is again held from the circuit: earth, contact 114, contact 103, relay 102, battery. The disconnection is performed as described above.

By providing in the installation according to the present invention only two filters it is comparatively easy to find in every language short words, numbers or other sounds that are suitable for the filters 26, 27, i. e. that contain only low frequencies or only high frequencies. Incidentally, it is possible to adjust the filter frequencies as desired by means of the condensers 28, 29 whereby they are set for certain words, numbers or other sounds. Of further advantage is the fact that the described installation can be connected to any desired telephone system, irrespective of whether it is adjusted from 300 to 2500 Hertz or for 200 to 3000 Hertz. Although only two filters are provided the present invention makes it possible to use 2000 coding combinations. No special conditions attach to the calls, they may be long or short. The only condition is that their frequency should conform to the coding combination for which the installation has been adjusted.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In the coded telecontrol of a telephonograph installation, connected to a telephone system, terminal means for connection to the telephone system to receive electrical impulses therefrom, a coding device in said telecontrol circuit, means connecting said coding device and said terminal means and including normally open circuit closers operable upon receipt of impulses from the terminal means to close said circuit means, a pair of filters respectively responsive to high and low frequencies and each having a magnetic core and primary and secondary windings, a filter amplifier connected to said terminal means, amplifier circuit means connecting the primary windings of said filters in parallel to said filter amplifier, electronic tubes each having a grid conductively connected to one end of the secondary winding of a respective filter and a plate circuit connected through relay means with said coding device, a variable condenser for each filter and bridged between the respective grid and the remaining end of the secondary winding, a short circuit connection in the amplifier, circuit means between the amplifier and the filters and including a normally closed circuit closer, and means operable upon receipt of impulses from the terminal means to effect opening of the circuit closer of said short circuit upon the receipt of impulses by said terminal means.

2. In the coded telecontrol of a telephonograph installation, connected to a telephone system, terminal means for connection to the telephone system to receive electrical impulses therefrom, a coding device in said telecontrol circuit, means connecting said coding device and said terminal means and including normally open circuit closers operable upon receipt of impulses from the terminal means to close said circuit means, a pair of filters respectively responsive to high and low frequencies and each having a magnetic core and primary and secondary windings, a filter amplifier connected to said terminal means, amplifier circuit means connecting the primary windings of said filters in parallel to said filter amplifier, electronic tubes each having a grid conductively connected to one end of the secondary winding of a respective filter and a plate circuit connected through relay means with said coding device, a variable condenser for each filter and bridged between the respective grid and the remaining end of the secondary winding, a short circuit connection in the amplifier circuit means between the amplifier and the filters and including a normally closed circuit closer, and means operable upon receipt of impulses from the terminal means to effect opening of the circuit closer of said short circuit upon the receipt of impulses by said terminal means, reproduction means provided with a sound carrier and a speaker head, an impulse actuated relay including a magnet winding, circuit means connecting said terminal means and said speaker head with said magnet winding, an electronic valve in said last circuit means and having an anode and a cathode, an anode circuit for said valve including a contact controlled by the relay magnet, said contact normally closing the anode circuit and a grounding circuit controlled by said last contact and arranged to ground the anode circuit upon impulses being received by said magnet from said head.

3. In the coded telecontrol of a telephonograph installation, connected to a telephone system, terminal means for connection to the telephone system to receive electrical impulses therefrom, a coding device in said telecontrol circuit means connecting said coding device and said terminal means and including normally open circuit closers operable upon receipt of impulses from the terminal means to close said circuit means, a pair of filters respectively responsive to high and low frequencies and each having a magnetic core and primary and secondary windings, a filter amplifier connected to said terminal means, amplifier circuit means connecting the primary windings of said filters in parallel to said filter amplifier, electronic tubes each having a grid conductively connected to one end of the secondary winding of a respective filter and a plate circuit connected through relay means with said coding device, a variable condenser for each filter and bridged between the respective grid and the remaining end of the secondary winding, a short circuit connection in the amplifier circuit means between the amplifier and the filters and including a normally closed circuit closer, and means operable upon receipt of impulses from the terminal means to effect opening of the circuit closer of said short circuit upon the receipt of impulses by said terminal means, a coding circuit means connecting respective ones of said plate circuits to the coding device, each of said last means including a delayed action relay having a normally open contact in the respective circuit, each said last circuit having battery connections and a condenser interposed therein, and a normally closed relay contact in its battery connection.

4. The invention recited in claim 1, said coding device including stepping switch means responsive to a succession of signal-actuated incoming excitations of respective high or low frequecy from the respective filters to cause successive stepping of said switch, and adjustable switch means for selectively associating one of said filter plate circuits with each position of said stepping switch, whereby only the correct sequence of incoming excitations of respective high or low frequency, in accordance with the setting of said adjustable switch means will cause correct operation of said coding device.

5. In the coded telecontrol of a telephonograph installation, connected to a telephone system, terminal means for connecting to the telephone system to receive electric impulses therefrom representing incoming communication signals, a coding device in said telecontrol system, coding switch means controlled by said coding device for actuating reproduction of a previously recorded message in said telephonograph, a pair of amplifiers, a pair of filters having input terminals connected to said terminal means for passing respective high and low frequencies and having output leads respectively connected to a pair of relays through said respective amplifiers, whereby an incoming signal of high frequency will actuate one of said relays and an incoming signal of low frequency will actuate the other of said relays, said coding device including stepping switch means responsive to a succession of signal actuated incoming excitations of respective high or low frequency from the respective filter relays to cause successive stepping of said switch, and adjustable switch means for selectively associating one of said filter plate circuits with each position of said stepping switch, whereby only the correct sequence of incoming excitations of respective high or low frequency, in accordance with the setting of said adjustable switch means will cause correct operation of said coding switch means.

References Cited in the file of this patent

UNITED STATES PATENTS

| | | |
|---|---|---|
| 2,171,366 | Hipple | Aug. 29, 1939 |
| 2,519,568 | Handschin | Aug. 22, 1950 |
| 2,537,407 | Handschin et al. | Jan. 9, 1951 |